United States Patent Office 3,274,488
Patented Sept. 20, 1966

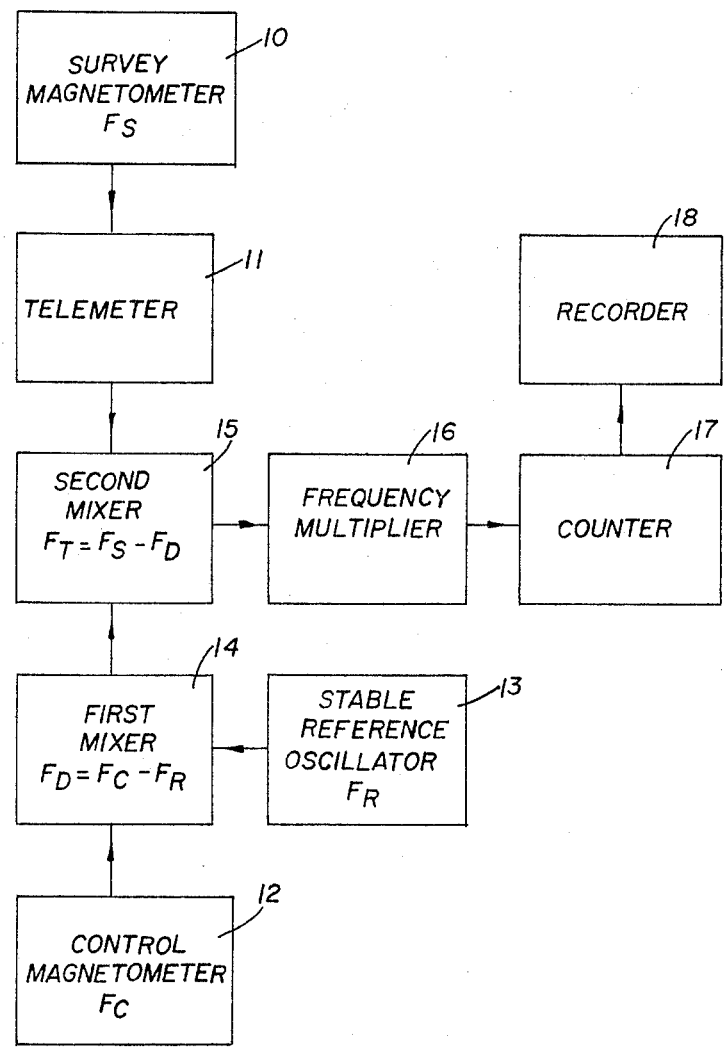

3,274,488
APPARATUS FOR MEASURING MAGNETIC INTENSITY WITH COMPENSATION FOR DIURNAL VARIATIONS
Stephen Washkurak and Peter Sawatzky, Ottawa, Ontario, Canada, assignors to Her Majesty the Queen in right of Canada, as represented by the Minister of Mines and Technical Surveys
Filed Mar. 22, 1963, Ser. No. 267,133
Claims priority, application Canada, Mar. 30, 1962, 845,684
3 Claims. (Cl. 324—43)

The invention relates to a method and apparatus for measuring magnetic intensity and is concerned with the automatic correction of magnetic intensity survey readings for geomagnetic short-term or diurnal variations.

Prior to the invention the steps taken to make the necessary corrections for diurnal variations in magnetic intensity have added considerably to the cost of the surveys without obtaining the maximum accuracy in the corrections. It has been necessary to conduct magnetic intensity surveys during periods of relatively undisturbed geomagnetic activity when only the regular smooth diurnal variation is present. In the case of ground magnetic intensity surveys corrections must be made to the raw data obtained during the survey based on data obtained later by re-occupying base stations or sub-base stations several times. In the case of airborne magnetic intensity surveys magnetic control lines must be flown across the survey lines at regular intervals to provide the necessary data for diurnal correction. An alternative method for diurnal correction of both airborne and ground surveys has been to operate a base station continuously during the progress of the survey and to subtract the base station variation from the survey readings, care being taken to see that base station and survey readings are accurately timed or synchronized to within a fraction of a second. Even though a good deal of time and expense is used on these procedures their accuracy cannot be relied upon in periods of disturbed magnetic activity.

The present invention avoids these difficulties in magnetic intensity surveys by providing a method and apparatus for synchronizing the correction for diurnal variations with the magnetic intensity survey readings so that immediate and continuous corrections are made.

According to the invention the magnetic intensity data obtained at a first location is telemetered to a second location remote from the first location where data is obtained indicative of the diurnal variations of the geomagnetic field. The obtaining of the diurnal variation data at the second location is synchronized with the obtaining of the magnetic intensity data at the first location and by subtracting the diurnal variation data from the magnetic intensity data, corrections may be immediately and continuously made for diurnal variations.

The invention saves both time and cost in magnetic intensity surveys because with the method and apparatus according to the invention it is not necessary to wait for magnetically inactive periods to conduct surveys. The corrections may be made automatically and precisely without danger of clerical error. It is an advantage of the invention that the overall weight and size of the equipment at the location of the survey is reduced because the computers and plotting tables can be located at a fixed control station to convert the telemetered data into map form. In the case of aeromagnetic surveys it is not necessary to fly control lines when the method and apparatus of the invention are used. This not only reduces the cost but makes surveys possible in mountainous terrain where it is impracticable to fly control lines.

If desired in accordance with the invention both the survey magnetometer and the control magnetometer may be mobile and if they are kept at a fixed distance from each other they become a gradiometer. Such a gradiometer would in accordance with the invention be free from magnetic diurnal variations.

The invention will be described further with reference to the accompanying drawing of a block schematic diagram showing apparatus in accordance with the invention. The construction and operation of each of the component parts of the apparatus shown in block form is well known to those skilled in the relevant art.

As shown in the drawing a mobile survey magnetometer 10 which may be airborne produces a signal of frequency $F_S$ indicative of the magnetic intensity at the location of the survey magnetometer 10. The construction and operation of magnetometers for this purpose are well known. The output signal of the survey magnetometer 10 is transmitted by telemeter apparatus 11 to apparatus located at a remote location where the corrections for diurnal variations are made and the corrected measurements are recorded.

The apparatus at the remote location comprises a control magnetometer 12 and a stable reference oscillator 13 connected to the inputs of a first mixer 14 of which the output is connected as one of the inputs to a second mixer 15. The mixers 14 and 15 are balanced, squirrel cage mixers. The other input of the second mixer 15 is the connection from the telemeter 11. The output of the second mixer is connected to a frequency measuring circuit which may consist of a frequency multiplier 16 a counter 17 and a recorder 18. Preferably the frequency multiplier 16 is the frequency multiplier described in Canadian Patent Number 618,762, issued April 18, 1961, Paul H. Serson inventor.

In operation the signals from the control magnetometer 12 and the stable reference oscillator 13 are subtracted in the first mixer 14 which has as its output a signal of frequency $F_D$ equal to $F_C$ minus $F_R$. The second mixer 15 has an output signal of frequency $F_T$ equal to $F_S$ minus $F_D$. The frequency $F_T$ is the diurnal corrected magnetometer survey frequency and this frequency is continuously indicated and recorded by the recorder 18.

Thus in accordance with the invention and as shown in the drawing the signal from the survey magnetometer is continuously telemetered to a remote station where a diurnal correction signal is automatically synchronized with it. The diurnal correcting signal is subtracted from the survey magnetometer signal to produce continuously the diurnal corrected magnetometer survey frequency $F_T$.

What we claim as our invention is:

1. Magnetic intensity survey apparatus comprising a mobile survey magnetometer adapted to produce a signal of which the frequency $F_S$ is indicative of magnetic intensity in the vicinity of the survey magnetometer, a control magnetometer for use at a location remote from that of the survey magnetometer and adapted to produce a signal of which the frequency $F_C$ is indicative of diurnal variations in magnetic intensity, a source of a stable reference signal having a frequency $F_R$, first mixer means having input connections to the control magnetometer and to the source of stable reference signal and adapted to produce at its output a signal of frequency $F_D$ equal to $F_C$ minus $F_R$, second mixer means having input connections to the output of the first mixer means and to the output of telemeter means adapted to transmit the signal from said mobile survey magnetometer, said second mixer means being adapted to produce at its output a signal of frequency $F_T$ equal to $F_S$ minus $F_D$, and means adapted to indicate the frequency $F_T$ of the output signal of the second mixer means.

2. Magnetic intensity survey apparatus as defined in claim 1 in which the means adapted to indicate the frequency $F_T$ comprises a frequency multiplier adapted to increase the frequency $F_T$, a counter connected to the output of the frequency multiplier, and a recorder connected to the output of the counter.

3. Magnetic intensity survey apparatus as defined in claim 2 in which the means adapted to indicate the frequency $F_T$ comprises a frequency multiplier adapted to increase the frequency $F_T$, a counter connected to the output of the frequency multiplier, and a recorder connected to the output of the counter.

References Cited by the Examiner

UNITED STATES PATENTS 2,996,657   8/1961   Varian _____ 324—43

WALTER L. CARLSON, *Primary Examiner.*

RICHARD B. WILKINSON, *Examiner.*

R. J. CORCORAN, *Assistant Examiner.*